US010789640B1

(12) United States Patent
Hayes

(10) Patent No.: US 10,789,640 B1
(45) Date of Patent: Sep. 29, 2020

(54) INTEGRATING A WALLET CLIENT WITH FEDERATED DIRECTORY SERVICES

(71) Applicant: Wells Fargo Bank, N.A., San Francisco, CA (US)

(72) Inventor: Thomas Hayes, Katy, TX (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 648 days.

(21) Appl. No.: 15/345,331

(22) Filed: Nov. 7, 2016

(51) Int. Cl.
*G06Q 30/00* (2012.01)
*G06Q 30/06* (2012.01)
*G06Q 20/36* (2012.01)

(52) U.S. Cl.
CPC ....... *G06Q 30/0639* (2013.01); *G06Q 20/363* (2013.01)

(58) Field of Classification Search
None
See application file for complete search history.

(56) References Cited

U.S. PATENT DOCUMENTS

| 8,639,621 | B1 * | 1/2014 | Ellis | G06Q 30/0255 |
| | | | | 705/41 |
| 2005/0207432 | A1 * | 9/2005 | Velez-Rivera | G06Q 30/02 |
| | | | | 370/401 |
| 2006/0085455 | A1 * | 4/2006 | Chmura | G06Q 10/06 |
| 2006/0116988 | A1 * | 6/2006 | Toebes | H04L 67/1021 |
| 2007/0055597 | A1 * | 3/2007 | Patel | G06Q 30/0206 |
| | | | | 705/35 |
| 2009/0006994 | A1 * | 1/2009 | Forstall | G01C 21/20 |
| | | | | 715/764 |
| 2010/0076968 | A1 * | 3/2010 | Boyns | H04W 4/21 |
| | | | | 707/732 |
| 2010/0125510 | A1 * | 5/2010 | Smith | G06Q 20/105 |
| | | | | 705/17 |
| 2013/0030919 | A1 * | 1/2013 | Brinson, Jr. | G06Q 30/0251 |
| | | | | 705/14.58 |

(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Walter Haverfield LLP; James J. Pingor

(57) ABSTRACT

Systems and methods provide for integrating a wallet client with federated directory services are disclosed herein. By integrating merchant services, such as directory services with a wallet service provider, wallet clients on mobile devices can have access to all merchant listings without having to manually add each directory service. The system disclosed herein integrates Chamber of Commerce directory service listings with the wallet client, such that when a request for a merchant directory service is received from a device associated with the wallet client, the request is forwarded to a federated directory service wallet system interface operated by a Chamber of Commerce site. Supply chain data that matches the request, and location information that is included in the request, is then fetched from the federated directory service wallet system interface and forwarded to the device that sent the request.

14 Claims, 8 Drawing Sheets

(56) References Cited

U.S. PATENT DOCUMENTS

2013/0166332 A1* 6/2013 Hammad ............... G06Q 40/10
    705/5
2014/0289675 A1* 9/2014 Stading ............... G06Q 50/184
    715/810

OTHER PUBLICATIONS

Normans Media Ltd.; "e-street.com and earthport partner to offer advanced e-wallet payment schemes"; Dec. 14, 2000; Normans Media Ltd.; (Year: 2000).*

* cited by examiner

US 10,789,640 B1

INTEGRATING A WALLET CLIENT WITH FEDERATED DIRECTORY SERVICES

BACKGROUND

Wallet service providers provide directory services of registered merchants as a means for merchants to interact with consumers. Consumers, using their mobile devices, can look up merchants through their wallet providers based on the directory services that are provided to the consumer. The directory services offered by the wallet service providers includes names of merchants, merchant classifications, and the locations of merchants. Since it is the responsibility of the merchant to ensure that they are included on the directory service lists organized by the wallet service providers, there is no guarantee that all wallet service providers will list all merchants in an area.

Stated differently, to provide a richness of service for a particular location area, the merchant would need systems and software to register with each wallet service provider and to provide content that could be interacted with the consumer. Although, certain merchants may be willing and knowledgeable enough to take advantage, a vast majority of merchants would not and this restricts the consumer's options to find merchants and affects merchants by limiting the potential customer base.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate integrating a wallet client with federated directory services. By integrating merchant services, such as directory services with a wallet service provider, wallet clients on mobile devices can have access to all merchant listings without having to manually add each directory service. The system disclosed herein integrates Chamber of Commerce directory service listings with the wallet client, such that when a request for a merchant directory service is received from a device associated with the wallet client, the request is forwarded to a federated directory service wallet system interface operated by a Chamber of Commerce site. Supply chain data that matches the request, and location information that is included in the request, is then fetched from the federated directory service wallet system interface and forwarded to the device that sent the request.

For these considerations, as well as other considerations, in one or more embodiments, a system can include a memory to store computer-executable instructions and a processor, coupled to the memory, to facilitate execution of the computer-executable instructions to perform operations. The operations can include receiving a request for merchant directory services from a mobile wallet client device associated with a mobile wallet account, wherein the request comprises metadata representing location information. The operations can also include forwarding the request to a federated directory service wallet system interface, and in response to the forwarding, receiving supply chain directory data associated with the location information. The operations can also include transmitting the supply chain directory data to the mobile wallet client device.

In another embodiment, a method for integrating a wallet client with federated directory services can include receiving, by a device comprising a processor, a request for a merchant directory service from a device associated with the wallet client, wherein the request comprises information representing location information. The method can also include forwarding, by the device, the request to a federated directory service wallet system interface, and in response to the forwarding, receiving supply chain directory data associated with the location information. The method can also include transmitting, by the device, the supply chain directory data to the device associated with the wallet client.

In another embodiment, a non-transitory computer-readable medium can comprise instructions that when executed by a computer processor perform operations including receiving a request for merchant directory services from a mobile wallet client device associated with a mobile wallet account, wherein the request comprises metadata representing location information. The operations can also include forwarding the request to a federated directory service wallet system interface, and in response to the forwarding, receiving supply chain directory data associated with the location information. The operations can further include transmitting the supply chain directory data to the mobile wallet client device.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
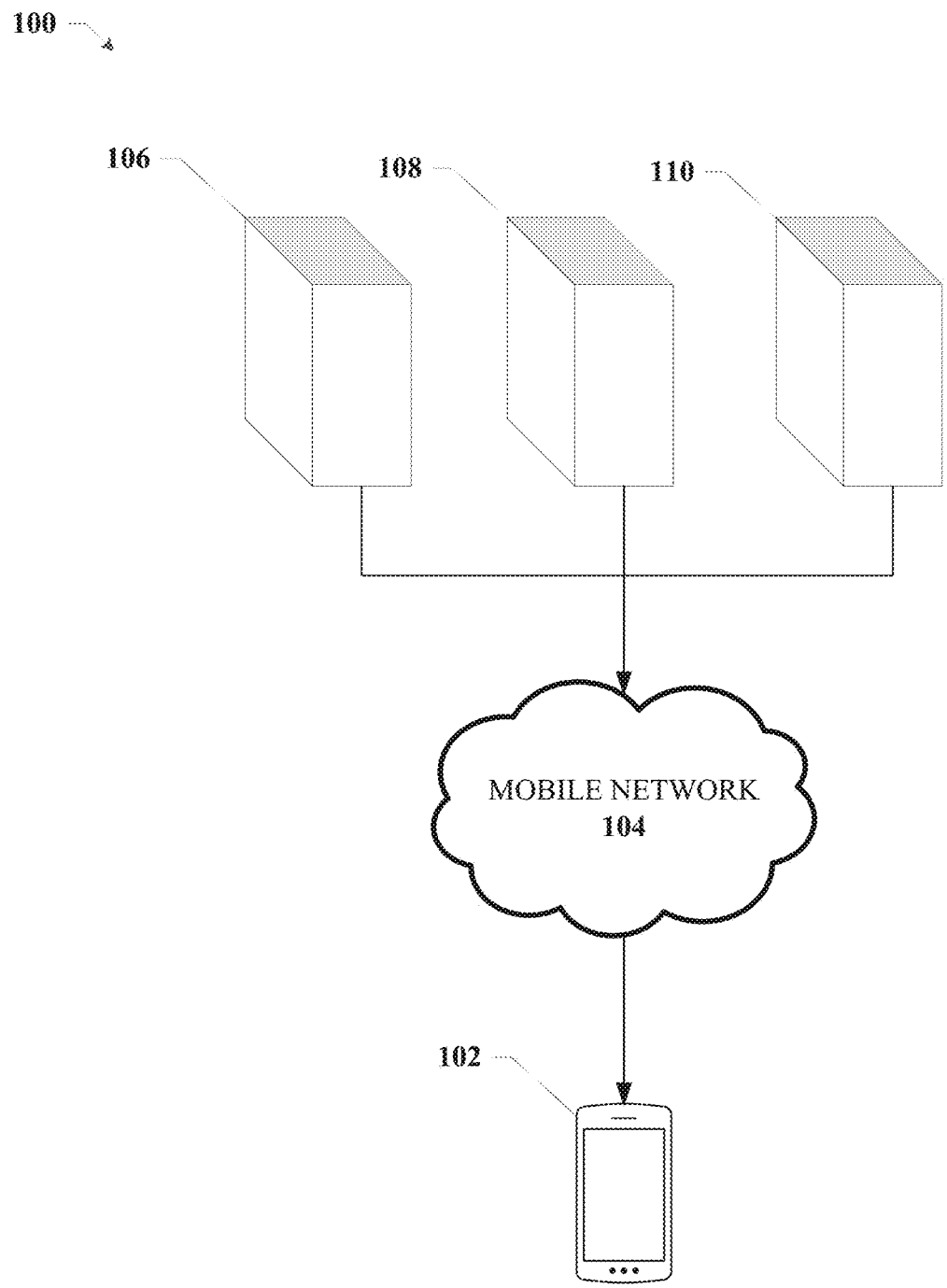
FIG. 1 is an illustration of an example system for integrating a wallet client with federated directory services in accordance with one or more aspects of the disclosure.

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In one or more embodiments, a federated directory services can be integrated with a wallet client to provide a user a more complete and up to date merchant listing service. This removes the onus from the merchant to get their services listed with each wallet client, and instead an intermediary can retrieve merchant listings and present them to the wallet clients. Accordingly, merchants do not need any particular knowledge of specific wallet service provider system access requirements, the number of systems required for a merchant to interface with, and any specific technical requirements to interface such data.

In one or more embodiments, a wallet client can send a location identifier and a federated directory service request and receive a response that includes federated supply chain directory services data and generate a user display of the received federated supply chain directory services data. A federated directory service wallet system can manage supply chain directory data services wherein the supply chain directory data includes at least a Standard Industrial Classification (SIC) Code, a North American Industry Classification System (NAICS) code, and a merchant designated classification code, and contact data.

A wallet server system can be included that integrates the federated supply chain directory service data with the wallet client and the federated directory service wallet system interface where the wallet server receives the location identifier and a federated directory service request from the wallet client and resolves the physical address of the federated directory service wallet system interface pursuant to the received location data. The wallet server system can then send a query to the identified federated directory service wallet system interface for supply chain directory data and in response to receiving the federated supply chain directory data sending the data to the wallet client.

A wallet service interface can receive a directory request from an associated wallet server. The wallet service interface, in response, queries a directory services system, such as LDAP or one of the other popular systems, for a specific supply chain or can simply provide all directory based supply chain data. In an embodiment, the wallet service interface can receive a directory request that has location information that can be used to query an appropriate directory services system for the supply chain data. Different directory service systems can cover various geographical areas and the wallet service interface can select the directory service system that corresponds to the location specified in the directory request. The location information can be metadata in the directory request or can be included with the body of the directory request. The location can be a zip code, address, geographical coordinates or other location information.

Turning now to FIG. 1, illustrated is an example system 100 for integrating a wallet client with federated directory services in accordance with one or more aspects of the disclosure. In the embodiment shown in FIG. 1, a mobile device 102 can retrieve directory service information from one or more of directory service servers 106, 108, and 110 via a wallet server interface in a mobile network 104.

The mobile device 102 can include a wallet client that can be used by a user to look up supply chain information and directory service information about one or more merchants. The user can enter a search query in a wallet client application, and the query can be forwarded to a wallet server interface via the mobile network 104. The search query can include search terms for merchant services such as specifying a merchant name or a type of merchant. The search query can also be further constrained by specifying a location or range of locations in which to return search results. In an embodiment, if no location is specified, the search query can be appended with a location by the mobile device 102. The location can take the form of geographical coordinates, address, zipcode, or other location information. In an embodiment, the location can be provided by global positioning system coordinates by the mobile device 102, or by network location services provided by the mobile device 102. In an embodiment, the search terms can specify a plurality of locations in which to search for merchant services.

In other embodiments, the mobile device 102 can append a location to the search query based on calendar or mapping information. For instance, if the mobile device 102 has a calendar application that has event information with a place name or location included in the event information, the search query can be appended with the place name or location from the event information. Alternatively or in addition, if the mobile device 102 has a mapping application that has route information (e.g., information about a destination or a route to a destination) the mobile device 102 can append location information that constrains the search for merchant services to locations along the route and/or at the destination.

The search query can include search terms for merchant services such as specifying a merchant name or a type of merchant. The wallet client application on the mobile device 102 or the wallet server interface accessible via the mobile network 104 can translate the search terms into supply chain classification codes that can be used to search the chamber of commerce servers. For instance, the search terms can include a Standard Industrial Classification (SIC) code, a North American Industry Classification System (NAICS) code, or a merchant designated classification code. The wallet server interface can forward the search query to one or more of the federated directory service servers 106, 108, and 110 based on the location in order to return results matching the search terms. The federated directory service servers 106, 108, and 110 can return supply chain data that includes results matching the search terms, and provide contact information about the results. The contact information can include phone numbers, address, website information, social media contact information, hours of operation, and other information about the merchants.

The wallet server interface facilitates communications between the mobile device 102 and the federated directory service servers 106, 108, and 110 so that the directory service servers 106, 108, and 110 don't have to setup their systems to interact with every mobile wallet client. The burden is moved from the merchants and the directory service providers to the wallet server system to facilitate communications.

Each of the federated directory service servers 106, 108, and 110 can be associated with a Chamber of Commerce for a region or a municipality. The federated directory service servers can retain directory information or supply chain information about merchants in their area. In other embodiments, the federated directory service servers may not be based on geographical areas, but may list merchants in specific industries. Whether geographically based, or industry based, the wallet server interface can direct the search request from the mobile device 102 based on the search terms and other metadata in the search request.

After the wallet server interface receives the supply chain data from the federated directory service servers 106, 108, and 110, the wallet server interface can transmit the supply chain data to the mobile device 102. The supply chain data can be a list of results that satisfy the search terms, with merchant listings matching the search terms in the location searched for.

Figure 2:
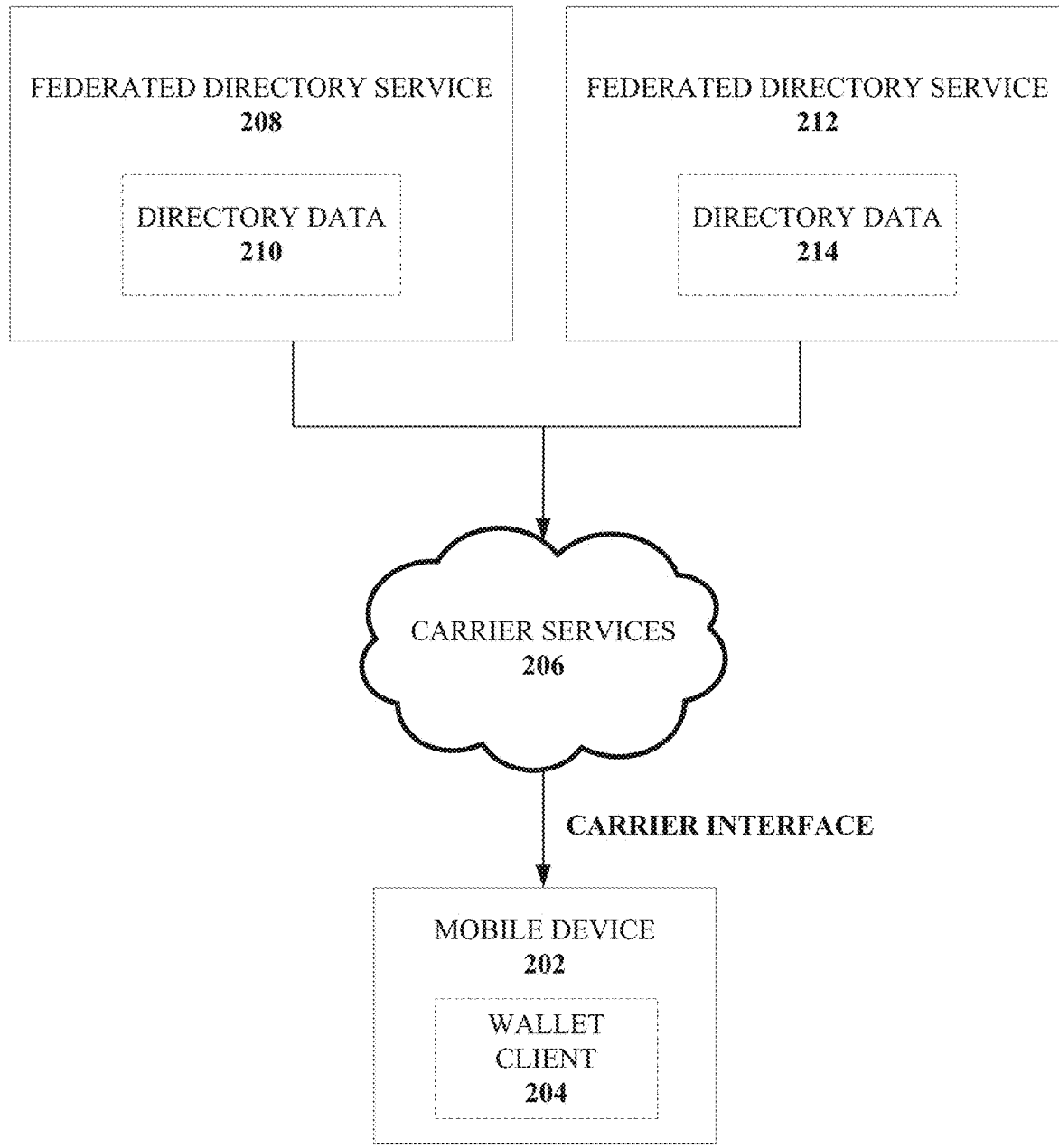
FIG. 2 is an illustration of an example system for integrating a wallet client with federated directory services in accordance with one or more aspects of the disclosure.

Turning now to FIG. 2, illustrated is an example system 200 for integrating a wallet client with federated directory services in accordance with one or more aspects of the disclosure. In the embodiment shown in FIG. 2, a mobile device 202 can retrieve directory service information from one or more of federated directory service servers 208 or 212 via a carrier services interface 206 accessible via a carrier interface (e.g., mobile network 104).

The mobile device 202 can include a wallet client 204 that can be used by a user to look up supply chain information and directory service information about one or more merchants. The user can enter a search query in a wallet client application, and the query can be forwarded to a carrier services interface 206 via the carrier interface. The search query can include search terms for merchant services such as specifying a merchant name or a type of merchant. The search query can also be further constrained by specifying a location or range of locations in which to return search results. In an embodiment, if no location is specified, the search query can be appended with a location by the mobile device 202. The location can take the form of geographical coordinates, address, zipcode, or other location information. In an embodiment, the location can be provided by global positioning system coordinates by the mobile device 202, or by network location services provided by the mobile device 202. In an embodiment, the search terms can specify a plurality of locations in which to search for merchant services.

In other embodiments, the mobile device 202 can append a location to the search query based on calendar or mapping information. For instance, if the mobile device 202 has a calendar application that has event information with a place name or location included in the event information, the search query can be appended with the place name or location from the event information. Alternatively or in addition, if the mobile device 202 has a mapping application that has route information (e.g., information about a destination or a route to a destination) the mobile device 202 can append location information that constrains the search for merchant services to locations along the route and/or at the destination.

The search query can include search terms for merchant services such as specifying a merchant name or a type of merchant. The wallet client application 204 or the carrier services interface 206 can translate the search terms into supply chain classification codes that can be used to search the chamber of commerce servers. For instance, the search terms can include a Standard Industrial Classification (SIC) code, a North American Industry Classification System (NAICS) code, or a merchant designated classification code. The carrier services interface 206 can forward the search query to one or more of the federated directory service servers 208 and/or 212 based on the location in order to return results matching the search terms. The federated directory service servers 208 and 212 can return supply chain data that includes results from the directory databases 210 and 214 matching the search terms, and provide contact information about the results. The contact information can include phone numbers, address, website information, social media contact information, hours of operation, and other information about the merchants.

The carrier services interface 206 facilitates communications between the mobile device 202 and the federated directory service servers 208 and 212 so that the directory service servers 208 and 212 don't have to setup their systems to interact with every mobile wallet client. The burden is moved from the merchants and the directory service providers to the carrier services 206 to facilitate communications.

Each of the federated directory service servers 208 and 212 can be associated with a Chamber of Commerce or other merchant directory aggregator for a region or a municipality. The federated directory service servers 208 and 212 can retain directory information or supply chain information about merchants in their area in directory databases 210 and 214 respectively. In other embodiments, the federated directory service servers 208 and 212 may not be based on geographical areas, but may list merchants in specific industries. Whether geographically based, or industry based, the wallet server interface can direct the search request from the mobile device 202 based on the search terms and other metadata in the search request.

After the carrier services interface 206 receives the supply chain data from the federated directory service servers 208 and 212, the carrier services interface 206 can transmit the supply chain data to the wallet client 204 via the mobile device 202. The supply chain data can be a list of results that satisfy the search terms, with merchant listings matching the search terms in the location searched for.

Figure 3:
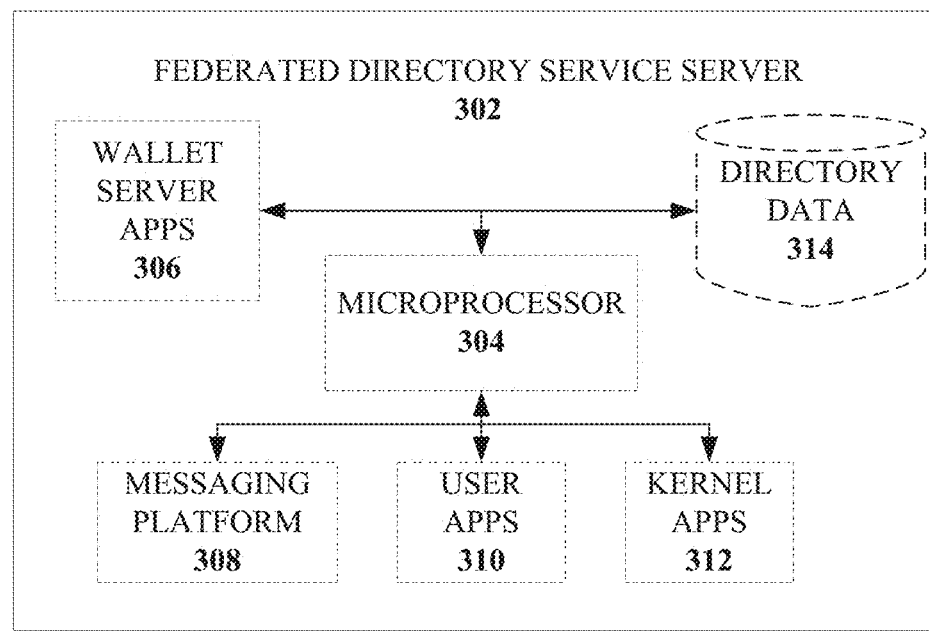
FIG. 3 is an illustration of an example federated directory service system in accordance with one or more aspects of the disclosure.

Turning now to FIG. 3, illustrated is an example federated directory service system 300 in accordance with one or more aspects of the disclosure. The federated directory service server 302 can be an in depth representation of one or more of the federated directory service servers 208 and/or 212 shown in FIG. 2. Federated directory service server 302 can include a microprocessor 304 that executes one or more computer executable instructions stored in a memory device. The computer executable instructions can be instructions that perform operations that facilitate providing directory service information and supply chain information in response to queries received from a carrier service interface (e.g., carrier service interface 206).

The federated directory service server 302 can include a wallet server apps component 306 that facilitates receiving and processing requests from a wallet server or the carrier services interface server. The messaging platform 308 and user apps component 310 can also facilitate communications to and from the mobile devices via the wallet server. A kernel space apps component 312 can also be provided to facilitate interfacing between kernel applications on the server 302. The federated directory service server 302 can also include a directory database 314 that stores supply chain and directory service data about merchants affiliated with the federated directory service. This can include Chamber of Commerce information about merchants and the information can be linked to Standard Industrial Classification (SIC) codes, North American Industry Classification System (NAICS) codes, or a merchant designated classification codes.

Figure 4:
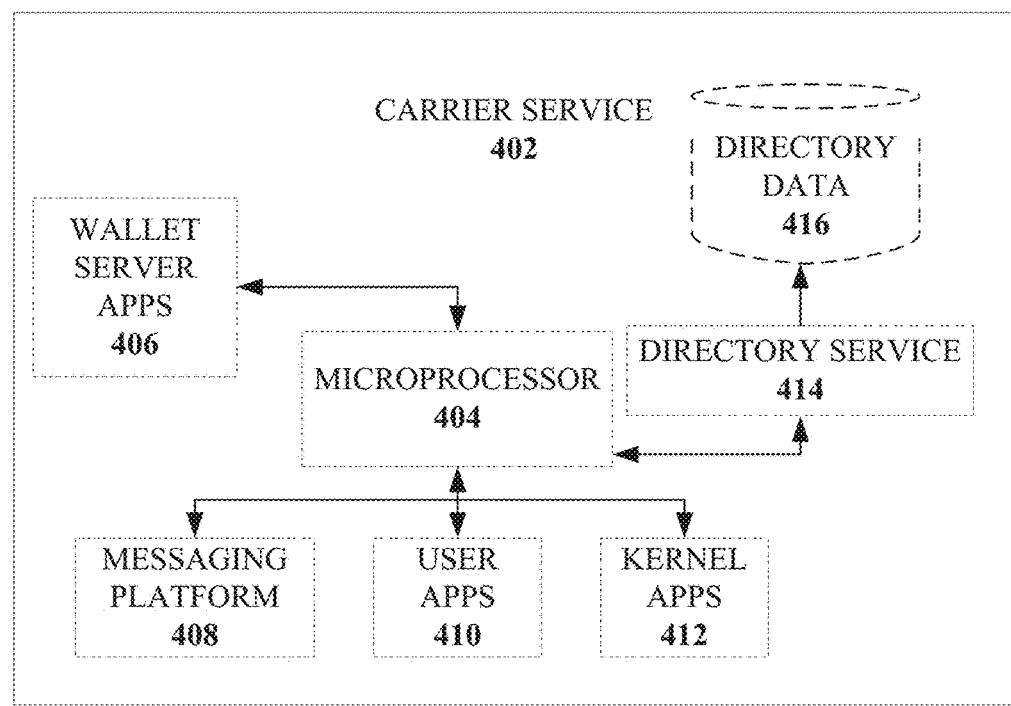
FIG. 4 is an illustration of an example carrier service system in accordance with one or more aspects of the disclosure.
Figure 4:
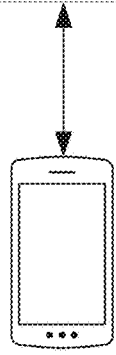

Turning now to FIG. 4, illustrated is an example carrier service system 400 in accordance with one or more aspects of the disclosure. The carrier service server 402 can be an in depth representation of the carrier service interface 206 shown in FIG. 2. Carrier service server 402 can include a microprocessor 404 that executes one or more computer executable instructions stored in a memory device. The computer executable instructions can be instructions that perform operations that facilitate providing directory service information and supply chain information in response to queries received from a mobile device (e.g., carrier service interface 202).

The carrier service server 402 can include a wallet server apps component 306 that facilitates receiving and processing requests from a wallet server or the carrier services interface server. The messaging platform 408 and user apps component 410 that can also facilitate communications to and from the mobile devices and the federated directory service servers. A kernel space apps component 412 can also be provided to facilitate interfacing between kernel applications on the server 402. The carrier service server 402 can also include a directory database 416 that stores some supply chain and directory service data separate from the federated directory service servers. This can be accessed via a directory service component 414 that can retrieve data pursuant to the search terms and other metadata included with the search request.

Figure 5:
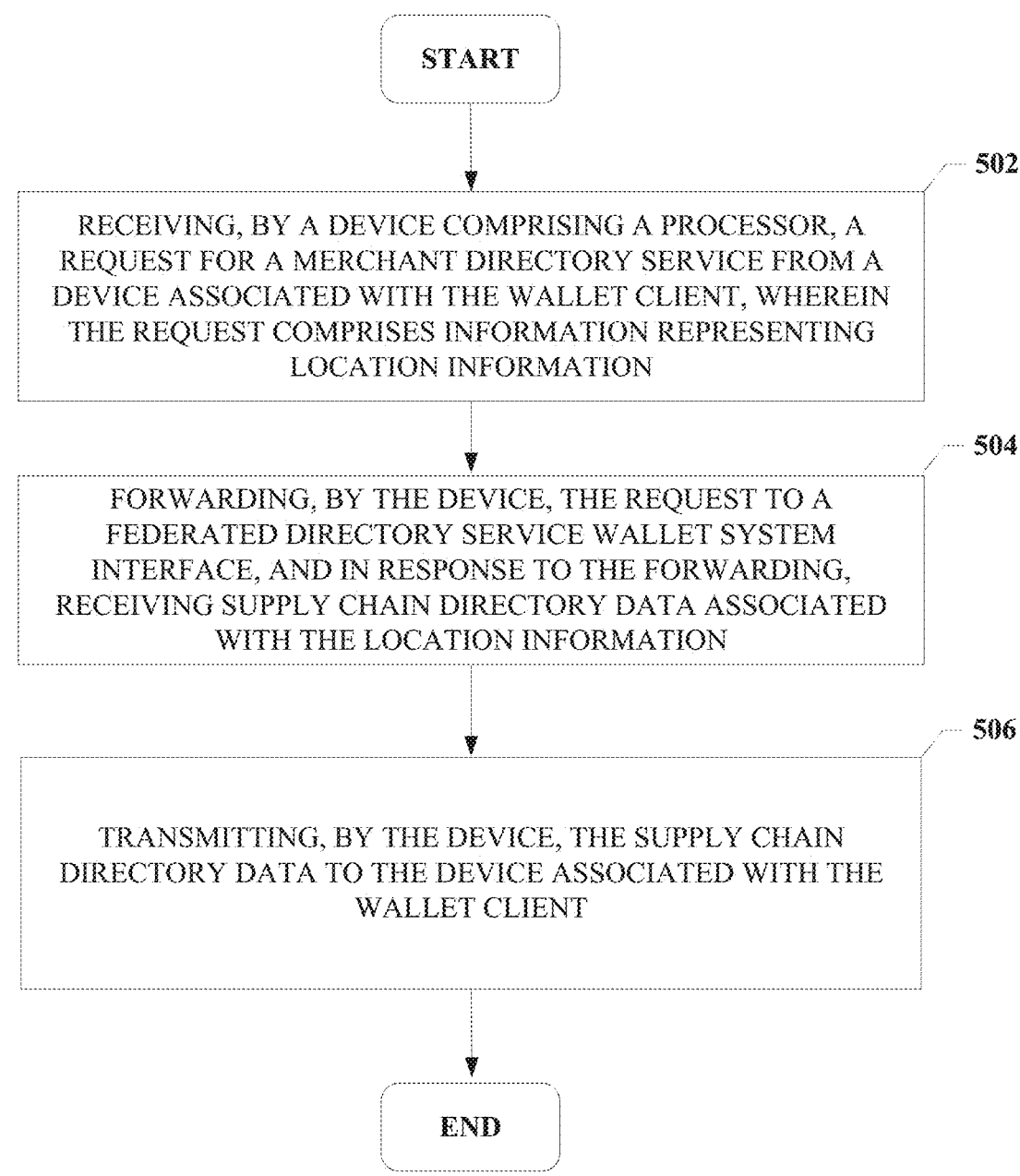
FIG. 5 is an illustration of an example flow chart of a method for integrating a wallet client with federated directory services according to one or more embodiments.
Figure 6:
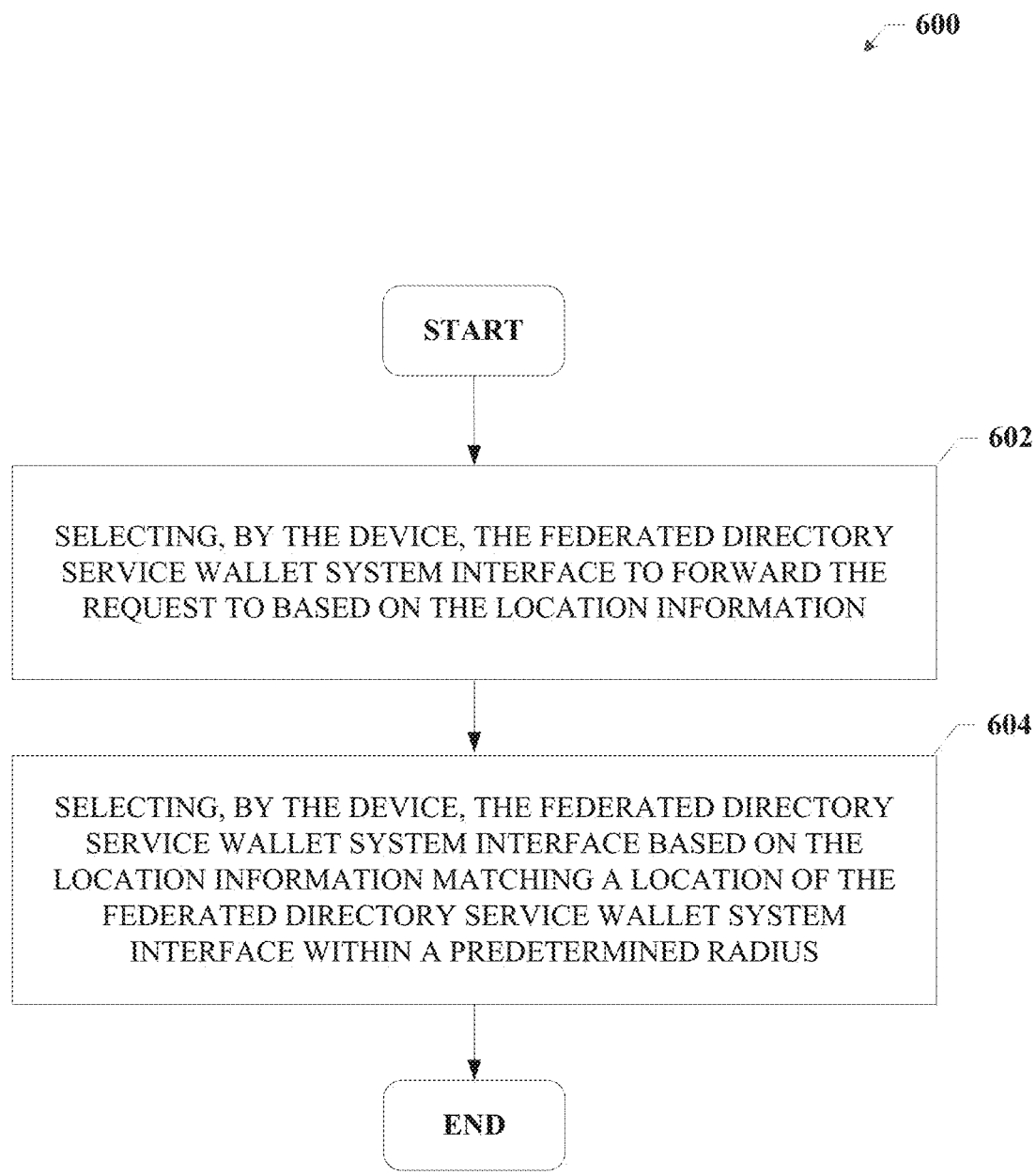
FIG. 6 is an illustration of an example flow chart of a method for integrating a wallet client with federated directory services according to one or more embodiments.

FIGS. 5-6 illustrates processes in connection with the aforementioned systems. The process in FIGS. 5-6 can be implemented for example by systems 100, 200, 300, and 400, illustrated in FIGS. 1-4 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 5, illustrated an example flow chart of a method 500 for integrating a wallet client with federated directory services according to one or more embodiments.

The method can start at 502, where the method includes receiving a request for merchant directory services from a mobile wallet client device associated with a mobile wallet account, wherein the request comprises metadata representing location information.

At 504, the method includes forwarding the request to a federated directory service wallet system interface, and in response to the forwarding, receiving supply chain directory data associated with the location information.

At 506, the method includes transmitting the supply chain directory data to the mobile wallet client device.

Turning now to FIG. 6, illustrated is an example flow chart of a method 600 for integrating a wallet client with federated directory services according to one or more embodiments.

At 602 the method includes selecting, by the device, the federated directory service wallet system interface to forward the request to based on the location information. At 604, the method includes selecting, by the device, the federated directory service wallet system interface based on the location information matching a location of the federated directory service wallet system interface within a predetermined radius.

Figure 7:
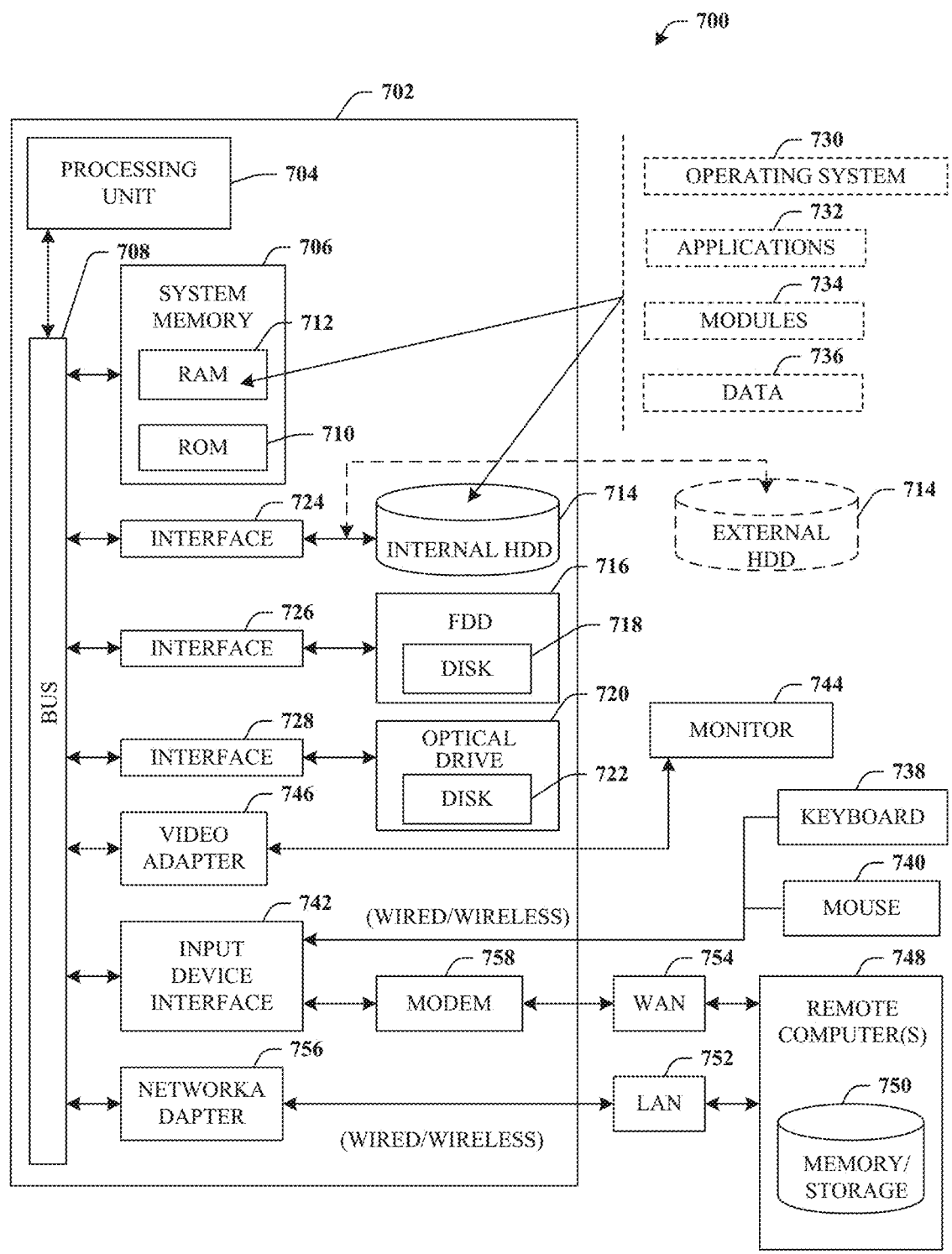
FIG. 7 is an illustration of an example computing environment where one or more of the provisions set forth herein are implemented, according to one or more embodiments.

Referring now to FIG. 7, there is illustrated a block diagram of a computer operable to execute the disclosed architecture. In order to provide additional context for various aspects of the subject innovation, FIG. 7 and the following discussion are intended to provide a brief, general description of a suitable computing environment 700 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects of the innovation includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 712, including an operating system 730, one or more application programs 732, other program modules 734 and program data 736. All or portions of the operating system, applications, modules, and/or data can also be cached in the RAM 712. The innovation can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules or components depicted relative to the computer 702, or portions thereof, can be stored in the remote memory/storage device 750. The network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 8:
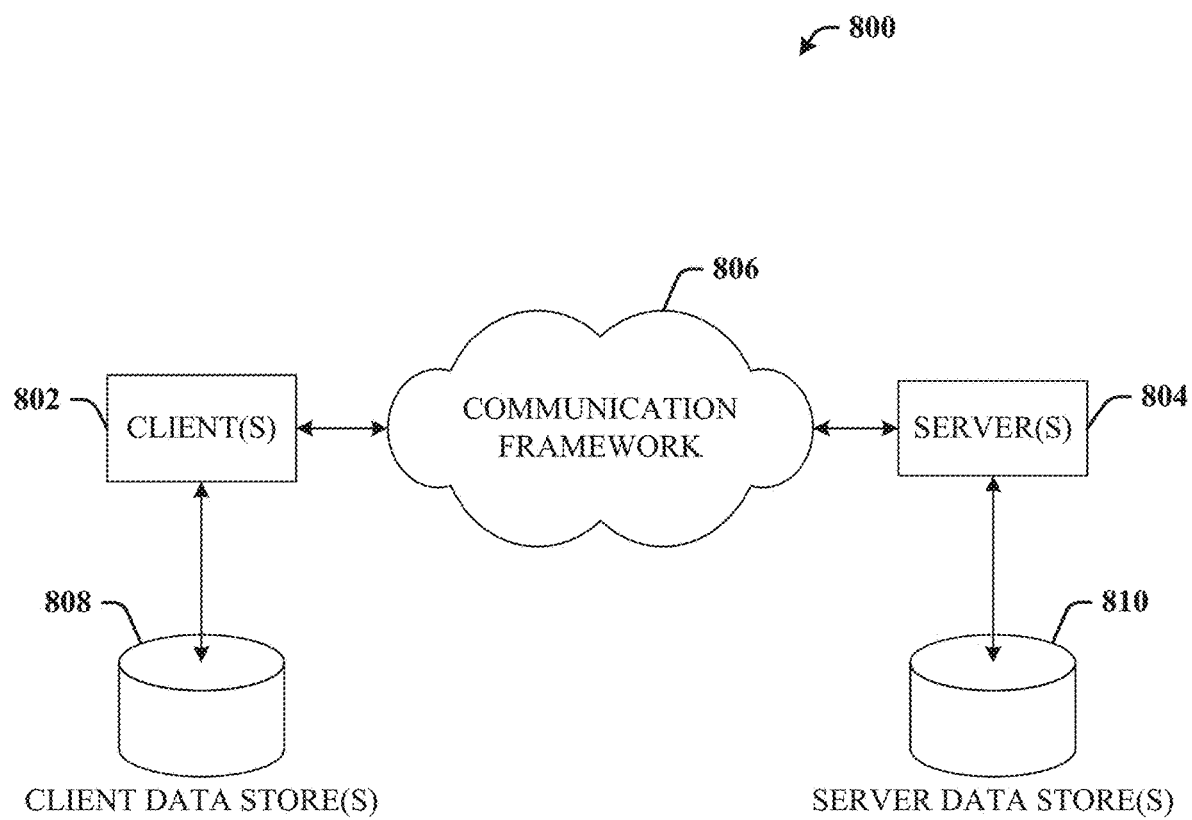
FIG. 8 is an illustration of an example computing environment where one or more of the provisions set forth herein are implemented, according to one or more embodiments.

Referring now to FIG. 8, there is illustrated a schematic block diagram of an exemplary computing environment 800 in accordance with the subject innovation. The system 800 includes one or more client(s) 802. The client(s) 802 can be hardware and/or software (e.g., threads, processes, computing devices).

The system 800 also includes one or more server(s) 804. The server(s) 804 can also be hardware and/or software (e.g., threads, processes, computing devices). The servers 804 can house threads to perform transformations by employing the innovation, for example. One possible communication between a client 802 and a server 804 can be in the form of a data packet adapted to be transmitted between two or more computer processes. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802. Similarly, the server(s) 804 are operatively connected to one or more server data store(s) 810 that can be employed to store information local to the servers 804.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
   a memory configured to store computer-executable instructions; and
   a processor, communicatively coupled to the memory, configured to execute the computer-executable instructions to perform operations, the operations comprising:
      receiving, by a wallet server, a request for merchant directory services from a mobile wallet client device associated with a mobile wallet account, wherein the request comprises metadata representing location information and search terms describing the merchant directory services and a merchant name;
      selecting the federated directory service wallet system interface to forward the request to based on the location information, wherein the selecting the federated directory service wallet system interface comprises selecting based on the location information matching a location of the federated directory service wallet system interface within a predetermined radius;
      forwarding, by the wallet server, the request to a federated directory service wallet system interface;
      translating, by the federated directory service wallet system interface, the merchant name into one or more supply chain classification codes;
      dynamically matching, by the federated directory service wallet system interface, supply chain directory data associated with the location information and the supply chain classification codes to the request;
      returning, by the federated directory service wallet system interface, results of supply chain directory data that match the location information and the supply chain classification codes to the wallet server; and
      transmitting, by the wallet server, the supply chain directory data to the mobile wallet client device.

2. The system of claim 1, wherein the predetermined radius is based on the request for merchant directory services.

3. The system of claim 1, wherein federated directory service wallet system interface is integrated with a chamber of commerce associated with an industry information in the request.

4. The system of claim 1, wherein the location information is GPS or cellular location information determined by the mobile wallet client device.

5. The system of claim 1, wherein the location information is based on request information entered into the mobile wallet client device.

6. The system of claim 5, wherein the location information is based on travel destination indicated in a calendar application on the mobile device.

7. The system of claim 1, wherein the supply chain directory data comprises information comprising at least one of a Standard Industrial Classification code, a North American Industry Classification System, and a merchant designated classification code.

8. A method for integrating a wallet client with federated directory services, comprising:
- receiving, by a wallet server comprising a processor, a request for a merchant directory service from a device associated with the wallet client, wherein the request comprises information representing location information and search terms describing the merchant directory services and a merchant name;
- selecting the federated directory service wallet system interface to forward the request to based on the location information, wherein the selecting the federated directory service wallet system interface comprises selecting based on the location information matching a location of the federated directory service wallet system interface within a predetermined radius;
- forwarding, by the wallet server, the request to a federated directory service wallet system interface;
- translating, by the federated directory service wallet system interface, the merchant name into one or more supply chain classification codes;
- matching, by the federated directory service wallet system interface, supply chain directory data associated with the location information and the supply chain classification codes; and
- transmitting, by the wallet server, the supply chain directory data to the device associated with the wallet client.

9. The method of claim 8, wherein the predetermined radius is based on the request for merchant directory services.

10. The method of claim 8, wherein federated directory service wallet system interface is integrated with a chamber of commerce associated with an industry information in the request.

11. The method of claim 8, wherein the location information is GPS or cellular location information determined by the mobile wallet client device.

12. The method of claim 8, wherein the location information is based on request information entered into the mobile wallet client device.

13. A non-transitory computer-readable medium, comprising instructions that when executed by a computer processor perform operations, comprising:
- receiving, by a wallet server, a request for merchant directory services from a mobile wallet client device associated with a mobile wallet account, wherein the request comprises metadata representing location information and search terms describing the merchant directory services and a merchant name;
- selecting the federated directory service wallet system interface to forward the request to based on the location information, wherein the selecting the federated directory service wallet system interface comprises selecting based on the location information matching a location of the federated directory service wallet system interface within a predetermined radius;
- forwarding, by the wallet server, the request to a federated directory service wallet system interface;
- translating the merchant name into one or more supply chain classification codes;
- matching supply chain directory data associated with the location information and the supply chain classification codes; and
- transmitting, by the wallet server, the supply chain directory data to the mobile wallet client device.

14. The non-transitory computer-readable medium of claim 13, wherein the predetermined radius is based on the request for merchant directory services.

* * * * *